United States Patent
Oh et al.

(10) Patent No.: US 10,279,806 B2
(45) Date of Patent: May 7, 2019

(54) LANE ESTIMATING APPARATUS AND METHOD

(71) Applicant: HYUNDAI MOTOR COMPANY, Seoul (KR)

(72) Inventors: Young Chul Oh, Seongnam-si (KR); Ki Cheol Shin, Seongnam-si (KR); Byung Yong You, Suwon-si (KR); Myung Seon Heo, Seoul (KR)

(73) Assignee: Hyundai Motor Company, Seoul (KR)

( * ) Notice: Subject to any disclaimer, the term of this patent is extended or adjusted under 35 U.S.C. 154(b) by 289 days.

(21) Appl. No.: 15/365,122

(22) Filed: Nov. 30, 2016

(65) Prior Publication Data

US 2018/0111613 A1   Apr. 26, 2018

(30) Foreign Application Priority Data

Oct. 20, 2016   (KR) .................. 10-2016-0136532

(51) Int. Cl.
| | |
|---|---|
| *G05D 1/02* | (2006.01) |
| *G06K 9/00* | (2006.01) |
| *G08G 1/16* | (2006.01) |
| *B60W 30/12* | (2006.01) |

(52) U.S. Cl.
CPC .......... *B60W 30/12* (2013.01); *G05D 1/0219* (2013.01); *G05D 1/0238* (2013.01);
(Continued)

(58) Field of Classification Search
CPC ............. B60W 30/12; B60W 2720/24; B60W 2420/42; B60W 2420/52; B60W 2550/10;
(Continued)

(56) References Cited

U.S. PATENT DOCUMENTS 8,775,063 B2 *  7/2014  Zeng ................... B60W 40/076
                                                   342/107
9,139,203 B2   9/2015  Moshchuk et al.
(Continued)

FOREIGN PATENT DOCUMENTS

| JP | H11-296799 A | 10/1999 |
|---|---|---|
| JP | 2004-205344 A | 7/2004 |

(Continued)

OTHER PUBLICATIONS

Office Action in Korean Application No. 10-2016-0136532 dated Sep. 15, 2017, 8 pages, untranslated.

*Primary Examiner* — Thomas Ingram
(74) *Attorney, Agent, or Firm* — Brinks Gilson & Lione

(57) ABSTRACT

The present disclosure provides a lane estimating apparatus and method. The apparatus includes: a lane determiner, an obstacle position calculator, a vehicle position corrector, and a lane estimator. The lane determiner compares a first lane detected by a first sensor with a lane on an actual road or a second lane on a local map to determine reliability of the first lane. The obstacle position calculator detects, when the reliability of the detected first lane is less than a preset reference, a first obstacle in the vicinity of a vehicle and a second obstacle on the local map, and calculates a difference between slopes and positions of straight lines extracted from the first obstacle and the second obstacle. The vehicle position corrector corrects a heading direction and a position of the vehicle based on the difference between the slopes and positions of the straight lines. In addition, the lane estimator estimates a driving lane on the local map.

20 Claims, 9 Drawing Sheets

(52) U.S. Cl.
CPC ......... *G06K 9/00798* (2013.01); *G08G 1/167* (2013.01); *B60W 2420/42* (2013.01); *B60W 2420/52* (2013.01); *B60W 2550/10* (2013.01); *B60W 2720/24* (2013.01); *G05D 2201/0213* (2013.01)

(58) Field of Classification Search
CPC ........ G06K 9/00; G08G 1/167; G05D 1/0219; G05D 1/0238; G05D 2201/0213
See application file for complete search history.

(56) References Cited

U.S. PATENT DOCUMENTS

| | | | | |
|---|---|---|---|---|
| 2012/0314070 | A1* | 12/2012 | Zhang | ................... B60W 40/00 348/148 |
| 2014/0149013 | A1 | 5/2014 | Matsuno | |
| 2014/0340518 | A1* | 11/2014 | Kambe | ............. G06K 9/00791 348/148 |

FOREIGN PATENT DOCUMENTS

| | | |
|---|---|---|
| JP | 2007-156626 A | 6/2007 |
| JP | 2012-093990 A | 5/2012 |
| JP | 2012-242262 A | 12/2012 |
| JP | 2013-097714 A | 5/2013 |
| JP | 2015-001773 A | 1/2015 |
| JP | 2016-038838 A | 3/2016 |
| KR | 10-2009-0098167 A | 9/2009 |
| KR | 10-2015-0108196 A | 9/2015 |
| KR | 10-1558756 B | 10/2015 |

* cited by examiner

LANE ESTIMATING APPARATUS AND METHOD

CROSS-REFERENCE TO RELATED APPLICATION

This application claims priority to and the benefit of Korean Patent Application No. 10-2016-0136532, filed on Oct. 20, 2016 which is incorporated herein in its entirety by reference.

FIELD

The present disclosure relates to a lane estimating apparatus and method.

BACKGROUND

The statements in this section merely provide background information related to the present disclosure and may not constitute prior art.

An autonomous driving system recognizes a single lane using a camera and performs autonomous driving on the basis of the recognized lane.

In the autonomous driving system, however, a recognition rate of the camera in recognizing a lane may be varied depending on a color and/or a state of a lane and a road with a large curvature may make it difficult for the camera to recognize a driving lane.

To accurately detect a position of a vehicle, the autonomous driving system with an aid of highly detailed map has been developed so as not to rely on performance of a camera in recognizing a driving lane.

However, the lane recognition technique based on a detailed map requires a high-degree of precision which must also accompany constant updates and causes inconvenience at the same time.

SUMMARY

The present disclosure provides a lane estimating apparatus and method capable of estimating a lane through a nearby obstacle without relying on a recognition rate of a camera and a high-degree dense map.

According to one form of the present disclosure, a lane estimating apparatus includes: a lane determiner configured to compare a first lane detected by a first sensor with a lane on an actual road or a second lane on a local map having previously stored information regarding reliable lane to determine reliability of the first lane; an obstacle position calculator configured to detect, when the reliability of the detected first lane is less than a preset reference, a first obstacle detected by a second sensor in the vicinity of a vehicle and a second obstacle on the local map corresponding to the first obstacle and to calculate a difference between slopes and positions of straight lines extracted from the first obstacle and the second obstacle; a vehicle position corrector configured to correct a heading direction and a position of the vehicle based on the difference between the slopes and positions of the straight lines extracted from the first obstacle and the second obstacle; and a lane estimator configured to estimate a driving lane based on the corrected heading direction and position of the vehicle on the local map.

According to another form of the present disclosure, a lane estimating method includes: comparing a first lane detected by a first sensor with a lane on an actual road or a second lane on a local map having previously stored information regarding reliable lane to determine reliability of the first lane; detecting, when the reliability of the detected first lane is less than a preset reference, a first obstacle detected by a second sensor in the vicinity of a vehicle and a second obstacle on the local map corresponding to the first obstacle and calculating a difference between slopes and positions of straight lines extracted from the first obstacle and the second obstacle; correcting a heading direction and a position of the vehicle based on the difference between the slopes and positions of the straight lines extracted from the first obstacle and the second obstacle; and estimating a driving lane with based on the corrected heading direction and position of the vehicle on the local map.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms of thereof, given by way of example, reference being made to the accompanying drawings, in which:

FIGS. 2 to 7B are views illustrating the operations of a lane estimating apparatus;

Figure 1:
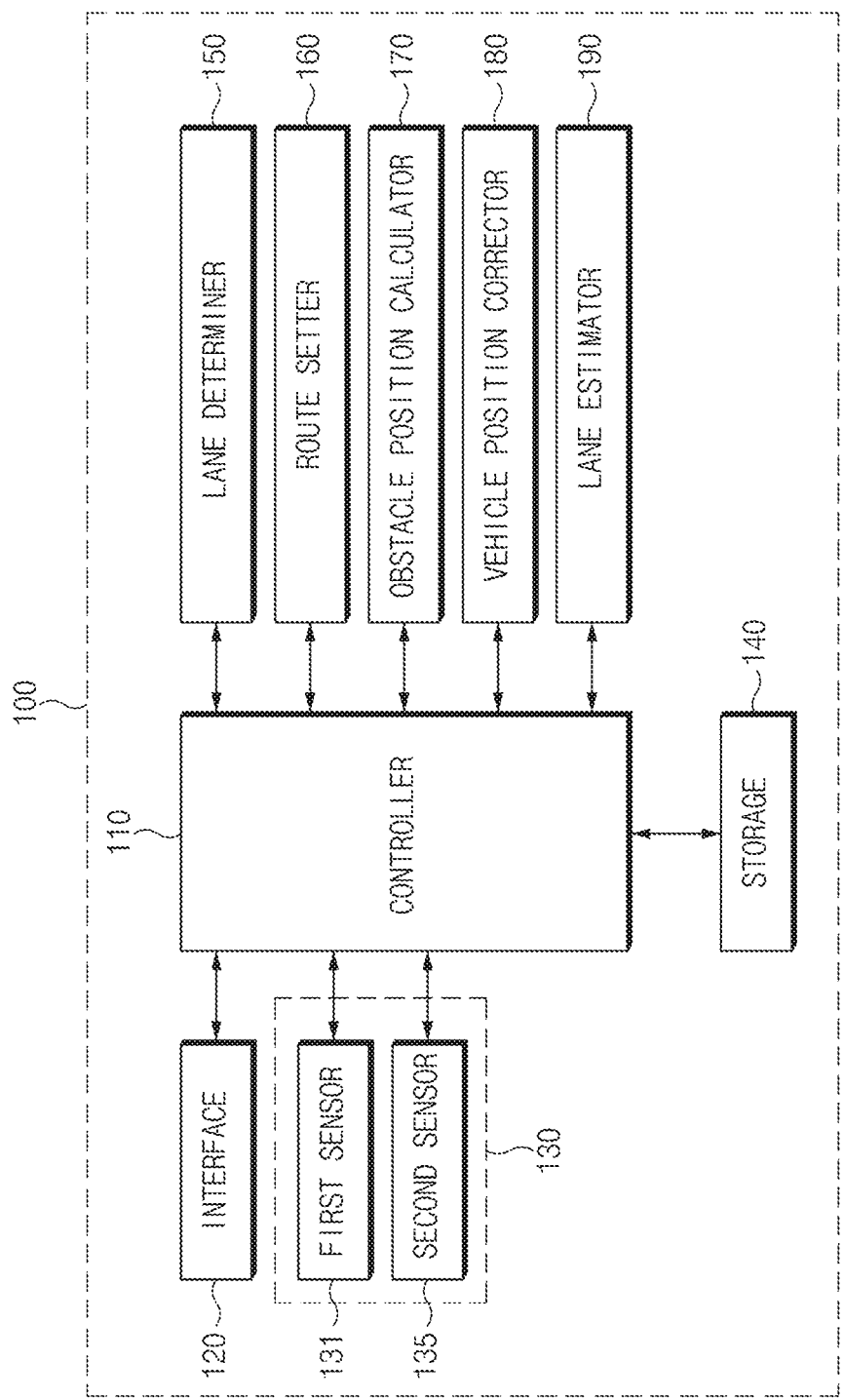
FIG. 1 is a block diagram illustrating a configuration of a lane estimating apparatus.

The drawings described herein are for illustration purposes only and are not intended to limit the scope of the present disclosure in any way.

DETAILED DESCRIPTION

The following description is merely one in nature and is not intended to limit the present disclosure, application, or uses. It should be understood that throughout the drawings, corresponding reference numerals indicate like or corresponding parts and features.

In describing the components of the present disclosure, terms such as first, second, A, B, (a), (b), etc., may be used. Such terms are used solely for differentiating the corresponding component from another and the corresponding components are not limited in their essence, sequence, or precedence by the terms. Unless indicated otherwise, all the terms used in the specification, including technical and scientific terms have the same meaning as those that are understood by those skilled in the art to which the present disclosure pertains. The terms defined in a dictionary should be interpreted to coincide with the meanings within the context of the related art, and they should not be ideally or excessively formally defined unless the context clearly dictates otherwise.

FIG. 1 is a block diagram illustrating a configuration of a lane estimating apparatus according to one form of the present disclosure.

A lane estimating apparatus 100 according to one form of the present disclosure may be implemented within a vehicle. Here, the lane estimating apparatus 100 may be integrally formed with internal control units of the vehicle or may be implemented as a separate apparatus and connected to the control units of the vehicle by a separate connection means. Also, the lane estimating apparatus 100 may operate in association with an engine and a motor of the vehicle, or may operate in association with a control unit controlling an operation of the engine or the motor.

Referring to FIG. 1, the lane estimating apparatus 100 may include a controller 110, an interface 120, a sensor part 130, a storage 140, a lane determiner 150, a route setter 160, an obstacle position calculator 170, a vehicle position corrector 180, and a lane estimator 190. Here, the controller 110 may process a signal transmitted between parts of the lane estimating apparatus 100.

First, the interface 120 may include an input part configured to receive a control command from a user and an output part configured to output an operational state, a result, and the like, of the lane estimating apparatus 100.

The input part may be a key button, a mouse, a joy stick, a jog shuttle, a stylus pen, and the like. Also, the input part may be a soft key implemented on a display.

The output part may include a display and a voice output means such as a speaker. Here, when a touch sensor such as a touch film, a touch sheet, a touch pad, and the like, is provided in the display, the display may operate as a touch screen and may be implemented as a form integrating an input part and an output part.

The display may include at least one of a liquid crystal display (LCD), a thin film transistor liquid crystal display (TFT LCD), an organic light emitting diode (OLED), a flexible display, a field emission display (ILD), or a 3D display.

The sensor part 130 may include a first sensor 131 configured to detect a lane and a second sensor 135 configured to detect an obstacle near a vehicle.

Here, the first sensor 131 may include a camera. The camera, a device for capturing an image around a vehicle, may capture an image including a lane from a front side and/or a rear side of the vehicle, and detect a lane from the captured image. The lane detected by the first sensor refers to a first lane.

The second sensor 135 may include one or more sensors configured to detect an obstacle positioned near the vehicle and to measure a distance to a corresponding obstacle. Here, an obstacle detected by the second sensor 135 refers to a first obstacle. For example, the second sensor 135 may include a ladar, a lider, an ultrasonic sensor, and the like. Also, the second sensor may be any sensor as long as it is able to detect an obstacle and measure a distance.

The storage 140 may store data and/or an algorithm required for the lane estimating apparatus 100 to operate.

For example, the storage 140 may store a result of detecting a lane by the first sensor 131, a result of detecting a nearby obstacle by the second sensor 135, result data by the lane determiner 150, the route setter 160, the obstacle position calculator 170, and the lane estimator 190, or may store an algorithm and/or setting value for deriving result data from each part. Also, the storage 140 may store local map data required for estimating a lane.

The storage 140 may include a storage medium such as a random access memory (RAM), a static random access memory (SRAM), a read-only memory (ROM), a programmable read-only memory (PROM), or an electrically erasable programmable read-only memory (EEPROM).

The lane determiner 150 determines reliability of a lane detected by the first sensor 131. Here, the lane determiner 150 may compare the lane detected by the first sensor 131 with a lane on an actual road to calculate accuracy of the detected lane.

Alternatively, the lane determiner 150 may retrieve a local map stored in the storage 140 and compare the lane detected by the first sensor 131 with a lane on the local map retrieved at a current position of the vehicle to calculate accuracy of the lane detected by the first sensor 131. Here, the lane detected from the local map refers to a second lane. Hereinafter, one form in which reliability of the lane detected by the first sensor 131 is determined by comparing the lane detected by the first sensor 131 with the lane on the local map will be largely described for the purposes of description, but the present disclosure is not limited thereto.

For example, the lane determiner 150 may calculate reliability (accuracy) of the lane detected by the first sensor using a cost function.

Figure 2:
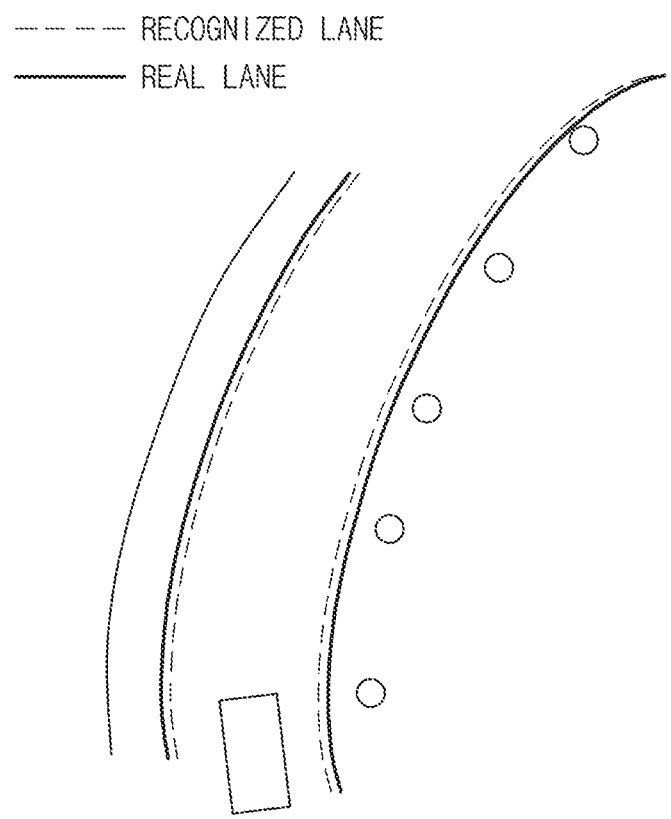

When reliability of the lane detected by the first sensor 131 is equal to or greater than a preset reference value, the lane determiner 150 determines that the corresponding lane is reliable. FIG. 2 is one form of determining reliability through the lane detected by the first sensor 131 and the lane on the local map. As illustrated in FIG. 2, when the lane detected by the first sensor 131 almost matches the lane on the local map, reliability of the lane detected by the first sensor 131 is equal to or greater than the preset reference value and may thus be recognized as a reliable lane.

Thus, as illustrated in FIG. 2, when the lane detected by the first sensor 131 is determined as a reliable lane, the controller 110 updates the local map stored in the storage 140 using the corresponding information.

If, however, reliability of the lane detected by the first sensor 131 is less than the preset reference value, the lane determiner 150 determines that the corresponding lane is not reliable. Also, when a lane is not detected by the first sensor 131, the lane determiner 150 may determine that there is no lane reliability. Here, the lane determiner 150 transfers the result of determining reliability of the lane to the controller 110.

When it is determined that the lane detected by the first sensor 131 is not reliable, the controller 110 controls operations of the route setter 160, the obstacle position calculator 170, the vehicle position corrector 180, and the lane estimator 190 to perform a lane estimating operation.

When the detected lane is reliable, the route setter 160 sets a target route on the basis of the lane detected by the first sensor 131. If, however, the detected lane is not reliable, the route setter 160 retrieves the local map, updates the current position of the vehicle on the retrieved local map, and sets a target route on the basis of the lane in the current position on the local map.

Figure 3:
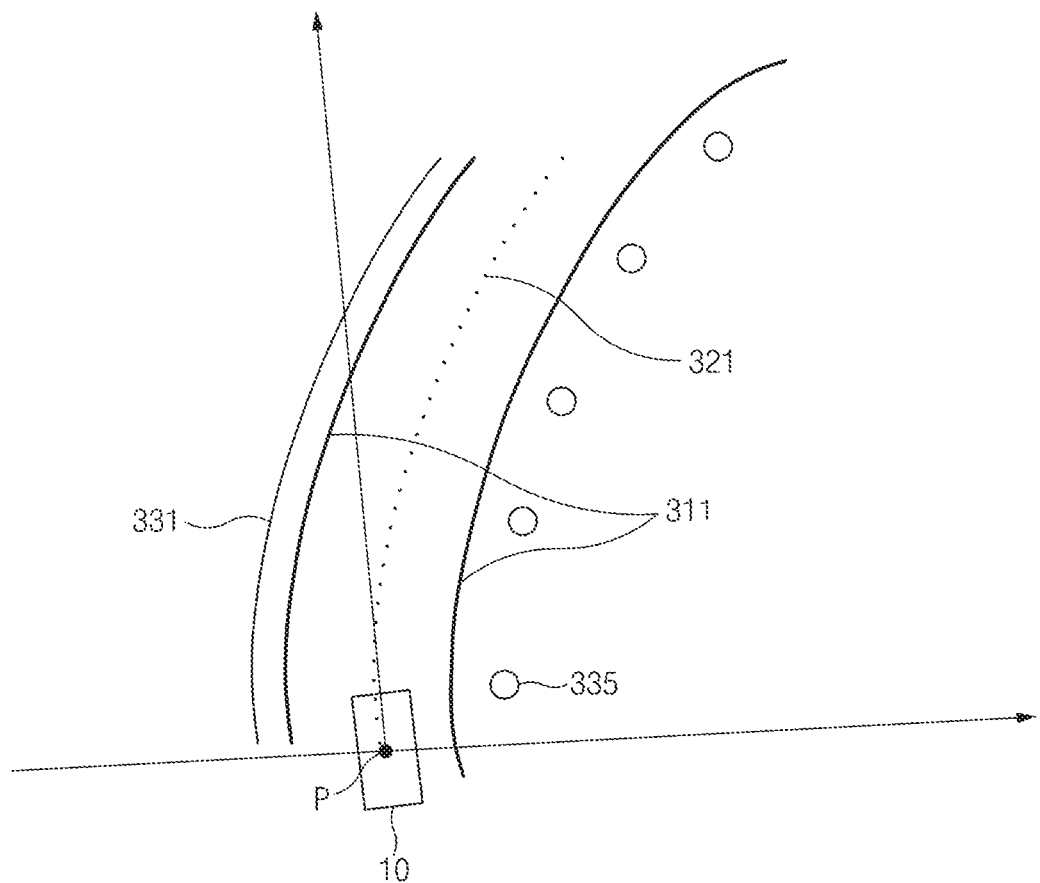

FIG. 3 illustrates one form of an operation of setting a target route using a local map in a state in which the first sensor 131 fails to detect a lane.

The local map has previously detected reliable lane information which has been updated, and thus, the route setter 160 sets a target route 321 by using lane information 311 on the local map. Here, the route setter 160 updates the current position of the vehicle 10 on the local map, and sets a target route 321 on the basis of the lanes 311 using the current position of the vehicle 10 as a starting point (a point (0, 0) on the x-y coordinates, i.e., P). The local map may include obstacle information denoted by reference numerals 331 and 335.

Also, after setting the target route on the basis of the lane on the local map, when a lane is estimated by the lane estimator 190, the route setter 160 may reset the target route on the basis of the estimated lane.

Figure 4:
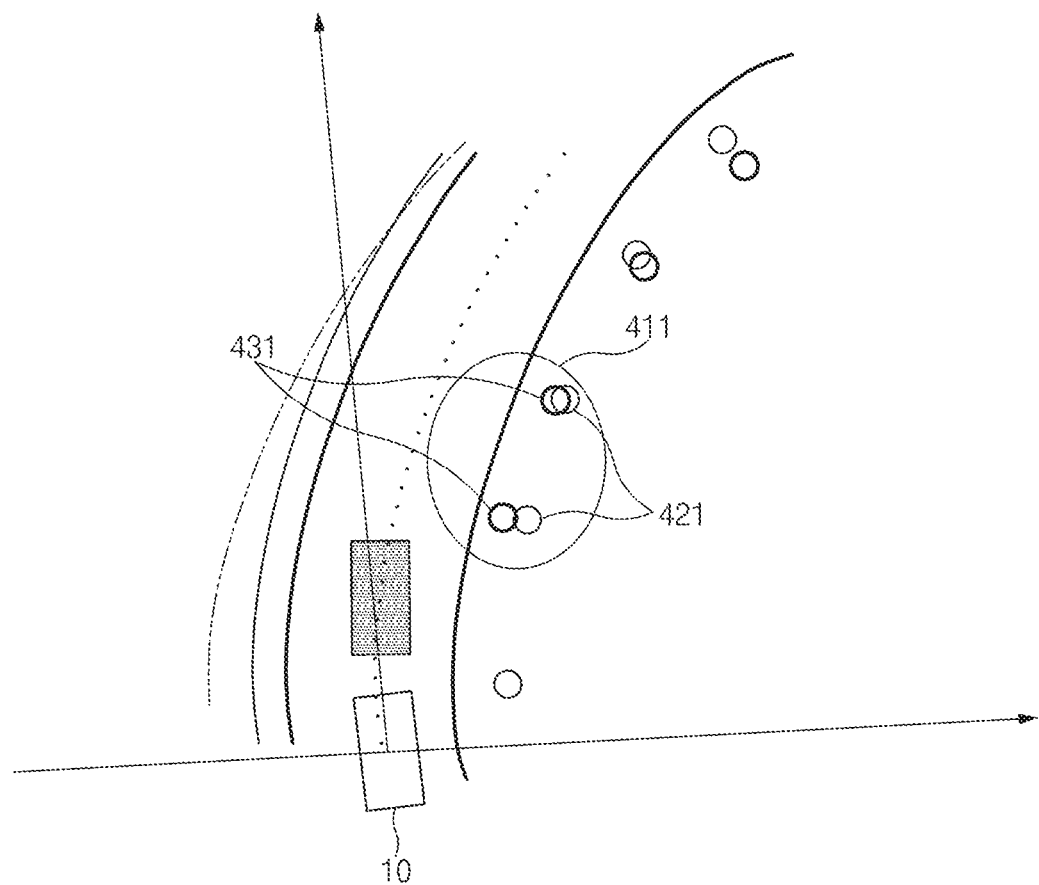

The obstacle position calculator 170 determines whether an obstacle detected by the second sensor 135 is a linear obstacle or a small obstacle according to a shape of the detected obstacle. Here, when a width of the detected obstacle, such as a large building, a guard rail, and the like, has length information equal to or greater than a reference value, the obstacle position calculator 170 recognizes the detected obstacle as a linear obstacle, and when a width of a detected obstacle, such as a streetlight, roadside trees, and the like, has length information smaller than the reference value, the obstacle position calculator 170 recognizes the detected obstacle as a small obstacle. In a case in which at least two small obstacles 431 denoted by reference numeral 411 of FIG. 4 are detected by the first sensor 131, the obstacle position calculator 170 may detect two same obstacles 421 as the two obstacles 431 previously detected by the first sensor 131, from the local map with respect to a current position of the vehicle 10. Here, the obstacles 421 detected from the local map refer to second obstacles.

Here, the obstacle position calculator 170 extracts a straight line connecting the two detected obstacles. For example, the obstacle position calculator 170 may extract a straight line (hereinafter, referred to as a "first straight line") connecting the two detected obstacles 421 on the local map, and extract a straight line (hereinafter, referred to as a "second straight line") connecting the two obstacles 431 detected by the first sensor 131.

Figures 5A, 5B:
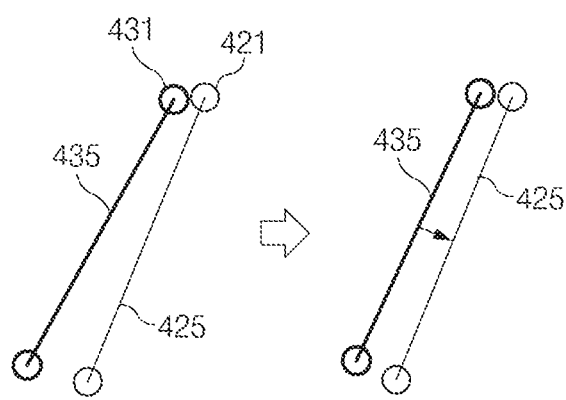

The first straight line and the second straight line extracted by the obstacle position calculator 170 may be illustrated in FIGS. 5A and 5B.

Referring to FIGS. 5A and 5B, the first straight line connecting the two obstacles 421 detected from the local map and the second straight line connecting the two obstacles 431 detected by the first sensor 131 may be different in slope and longitudinal/transverse position according to a heading direction and position of the vehicle as illustrated in FIG. 5A.

Thus, the obstacle position calculator 170 extracts slope information from each of the first straight line 425 and the second straight line 435, and calculates a difference between the slopes of the first straight line 425 and the second straight line 435. Also, the obstacle position calculator 170 calculates a difference between the first straight line and the second straight line in longitudinal and transverse positions.

The vehicle position corrector 180 corrects the heading direction of the vehicle by the difference between the slopes of the first straight line 425 and the second straight line 435 calculated by the obstacle position calculator 170. As illustrated in FIG. 5B, the vehicle position corrector 180 may correct the heading direction of the vehicle such that the slope of the second straight line 435 is the same as the slope of the first straight line 425. Also, as illustrated in FIG. 5B, the vehicle position corrector 180 may correct the longitudinal and transverse positions of the vehicle such that the position of the second straight line 435 is the same as the position of the first straight line 425 on the basis of the difference between the longitudinal and transverse positions of the first straight line 425 and the second straight line 435 calculated by the obstacle position calculator 170.

Figure 6:
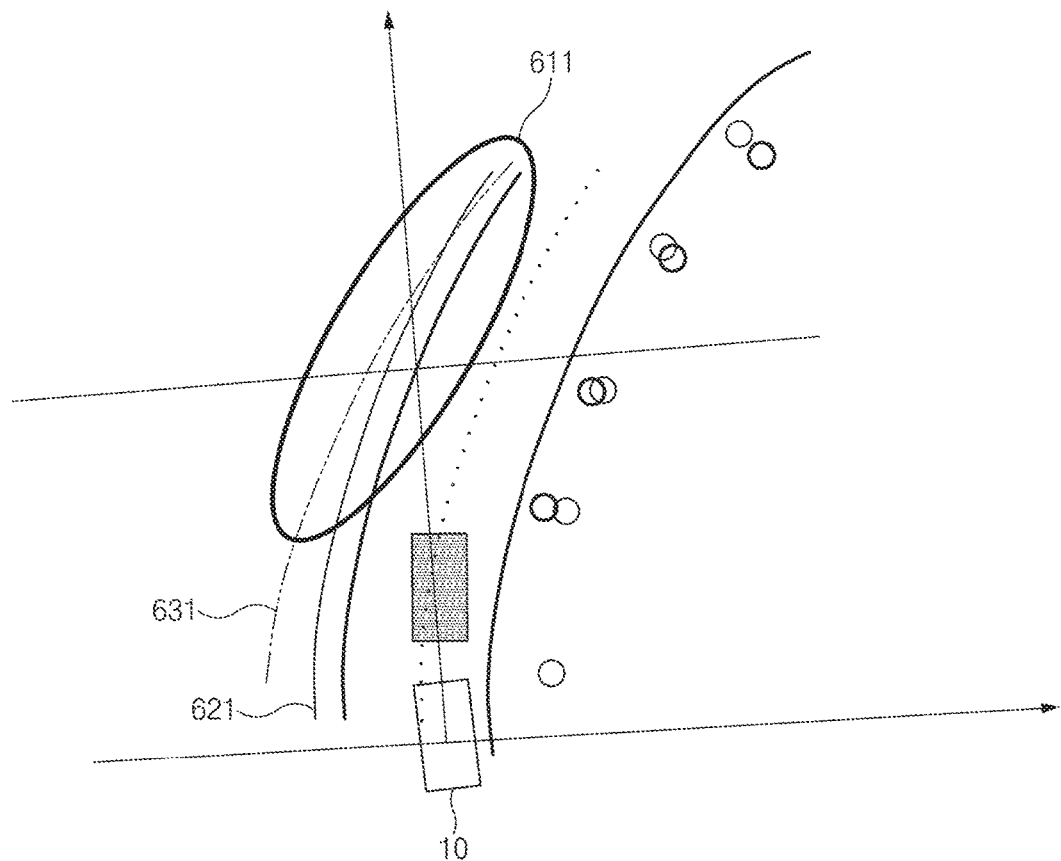

Meanwhile, when a linear obstacle 631 is detected by the first sensor 131 as denoted by reference numeral 611 of FIG. 6, the obstacle position calculator 170 may detect the same linear obstacle 621 as the linear obstacle 631 detected by the first sensor 131, from the local map, with respect to the current position of the vehicle 10.

Here, the obstacle position calculator 170 may extract a linear component from the linear obstacle and detect a straight line regarding the extracted linear component.

For example, the obstacle position calculator 170 may detect a third straight line regarding the linear obstacle 621 detected from the local map by making the linear component of the linear obstacle 621 detected from the local map a straight line or extracting a tangent regarding a curved line from a determined point when the extracted linear component is the curved line.

Also, the obstacle position calculator 170 may detect a fourth straight line regarding the linear obstacle 631 detected from the first sensor 131 by extracting a linear component from the linear obstacle 631 detected from the first sensor 131 and making the extracted linear component a straight line or by extracting a tangent regarding a corresponding curved line from a determined point when the extracted linear component is the curved line.

Figures 7A, 7B:
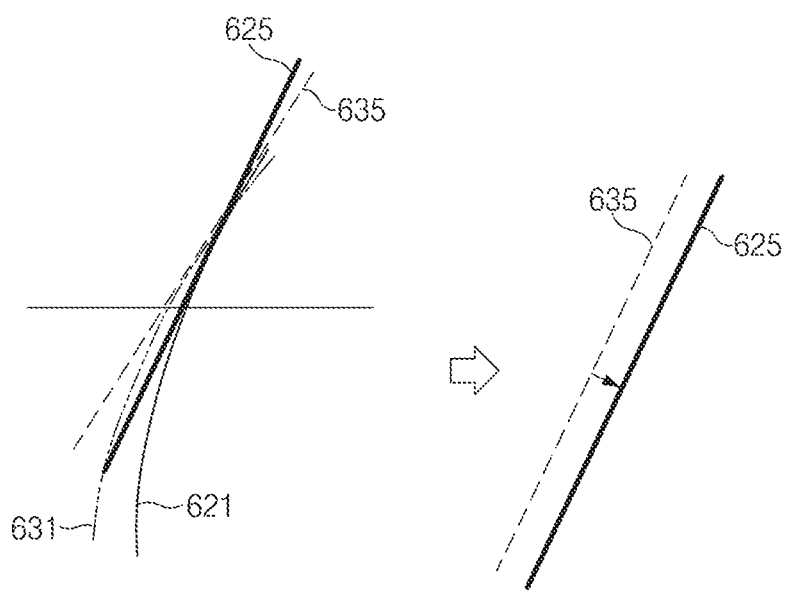

The third straight line and the fourth straight line detected by the obstacle position calculator 170 may be illustrated in FIG. 7A.

As illustrated in FIG. 7A, the third straight line 625 regarding the linear obstacle 621 detected from the local map and the fourth straight line 635 regarding the linear obstacle 631 detected by the first sensor 131 may be different in slope and longitudinal/transverse position according to a heading direction and position of the vehicle as illustrated in FIG. 7A.

Thus, the obstacle position calculator 170 extracts slope information from each of the third straight line 625 and the fourth straight line 635, and calculates a difference between the slopes of the third straight line 625 and the fourth straight line 635. Also, the obstacle position calculator 170 calculates a difference between the third straight line 625 and the fourth straight line 635 in longitudinal and transverse positions.

The vehicle position corrector 180 corrects the heading direction of the vehicle by the difference between the slopes of the third straight line 625 and the fourth straight line 635 calculated by the obstacle position calculator 170. As illustrated in FIG. 7B, the vehicle position corrector 180 may correct the heading direction of the vehicle such that the slope of the fourth straight line 635 is the same as the slope of the third straight line 625. Also, as illustrated in FIG. 7B, the vehicle position corrector 180 may correct the longitudinal and transverse positions of the vehicle such that the position of the fourth straight line 635 is the same as the position of the third straight line 625 on the basis of the difference between the third straight line 625 and the fourth straight line 635 in the longitudinal and transverse positions calculated by the obstacle position calculator 170.

As described above, the heading direction and position of the vehicle are corrected to be the same as the local map created with respect to a reliable lane by the vehicle position corrector 180. Thus, the lane estimator 190 estimates a lane on the basis of the vehicle position on the local map. The lane estimator 190 transfers the lane estimation result to the controller 110.

The controller 110 may provide the lane estimation result to the autonomous driving system.

Although not shown in FIG. 1, the lane estimating apparatus 100 according to one form of the present disclosure may further include a communicator (not shown).

The communicator may include a communication module supporting a communication interface with an electric/electronic component and/or control units provided in a vehicle. Here, the communication module may include a module supporting vehicle network communication such as controller area network (CAN) communication, local interconnect network (LIN) communication, flex-ray communication, and the like. Also, the communication module may include a module for wireless internet access or a module for short-range communication.

The apparatus configured as described above will be descried in more detail.

Figure 8:
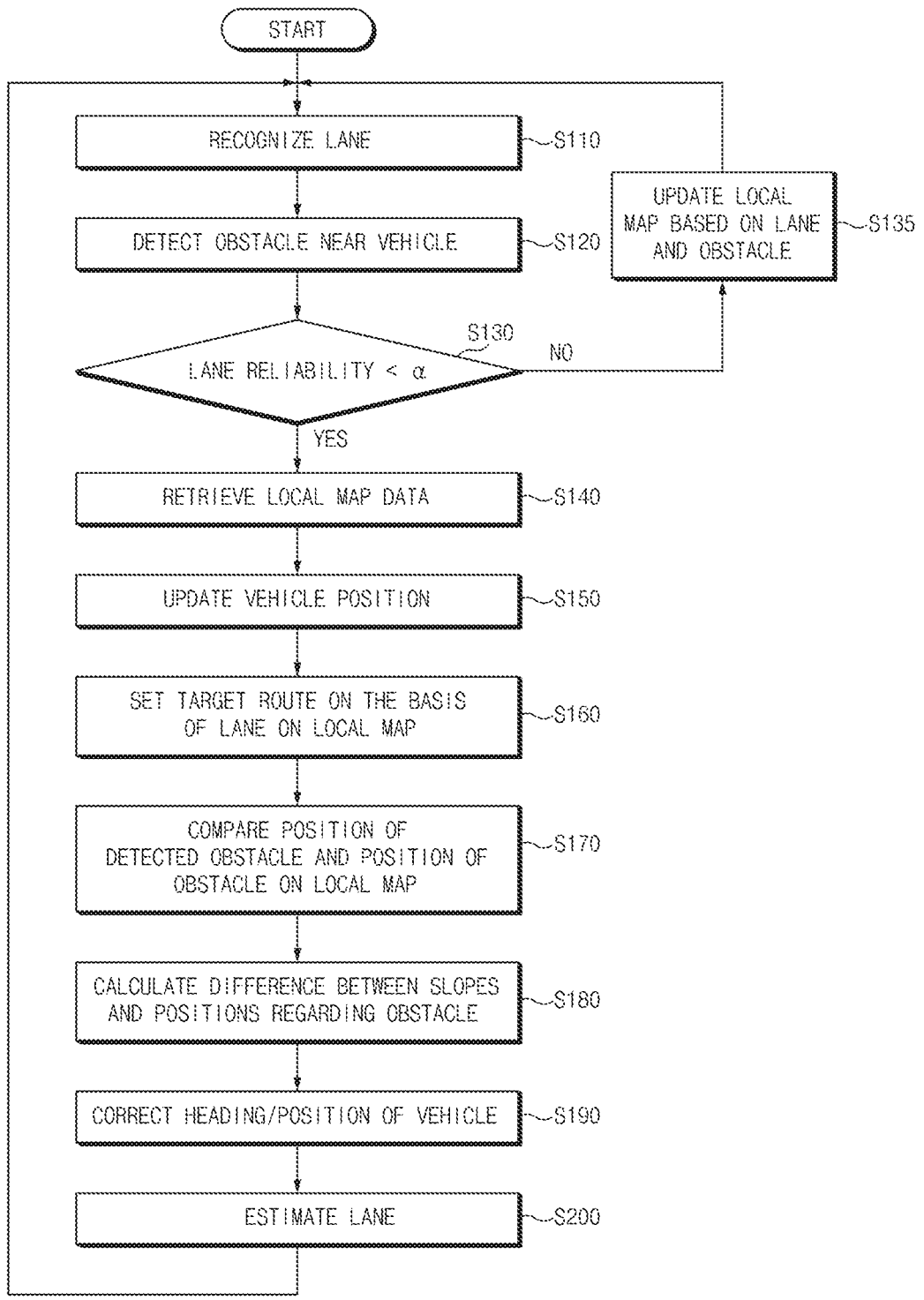
FIG. 8 is a flow chart illustrating an operation of a lane estimating method.

FIG. 8 is a flow chart illustrating an operation of a lane estimating method according to one form of the present disclosure.

As illustrated in FIG. 8, the lane estimating apparatus 100 recognizes a lane using the first sensor 131 in operation S110 and detects an obstacle near a vehicle using the second sensor 135 in operation S120.

Here, the lane estimating apparatus 100 calculates reliability of the lane recognized in operation S110, and when the calculated reliability is equal to or greater than a preset reference value (α) in operation S130, the lane estimating apparatus 100 determines that the corresponding lane is reliable, and updates a local map previously stored in the storage 140 using the corresponding lane information in operation S135. The reliability of the lane detected using the first sensor may be calculated by comparing the lane detected by the first sensor 131 with a lane on the local map.

Meanwhile, when the reliability of the lane is less than the preset reference value (α) in operation S130, the lane estimating apparatus 100 retrieves previously stored local map data in operation S140 to update a vehicle position in operation S150, and sets a target route on the basis of a lane on the local map in operation S160.

Thereafter, the lane estimating apparatus 100 detects the same obstacle as that detected in operation S120 from the local map, compares positions of the two obstacles in operation S170, and calculates a difference between slopes and positions of the obstacles in operation S180.

The lane estimating apparatus 100 corrects a heading direction of the vehicle using the difference in slope calculated in operation S180, and corrects the position of the vehicle in longitudinal and transverse directions using the difference in position calculated in operation S180, in operation S190.

Here, a specific one form regarding operations S170 to S190 may be illustrated in FIGS. 4 to 7B.

When the correction of the heading direction and position of the vehicle is completed, the lane estimating apparatus 100 estimates a lane on the basis of the vehicle position on the local map in operation S200.

Although not shown in FIG. 8, the lane estimating apparatus 100 may additionally perform an operation of determining whether the position of the vehicle updated on the local map is a reliable lane section on the local map, before operation S160. Here, when a current location of the vehicle on the local map corresponds to a reliable lane section, the lane estimating apparatus 100 may perform a process following operation S160, or otherwise, the lane estimating apparatus 100 may determine that estimation of a lane has failed, and terminates the lane estimating operation.

The lane estimating apparatus 100 operated as described above may be implemented in the form of an independent hardware device or as one of processors in the form of being a part of a hardware device that is different from a microprocessor or a general computer system.

Figure 9:
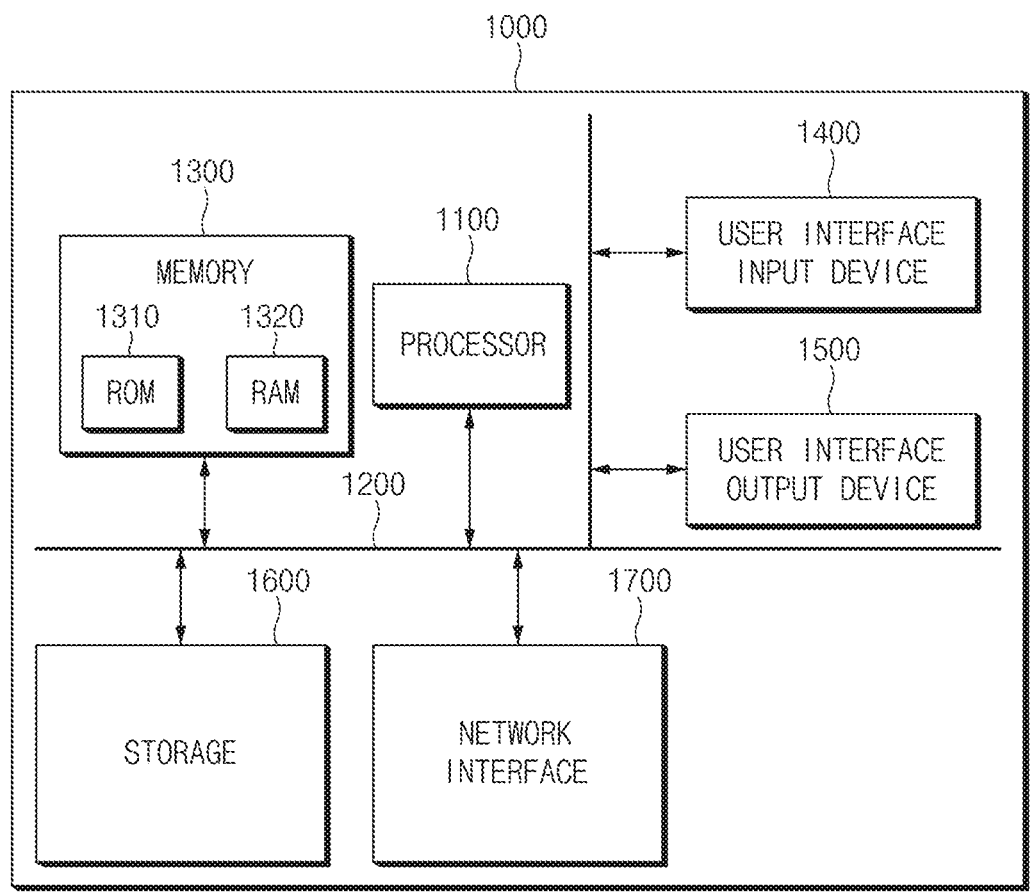
FIG. 9 is a view illustrating a configuration of a computing system to which the apparatus is applied.

FIG. 9 is a view illustrating a configuration of a computing system to which the apparatus according to the present disclosure is applied.

Referring to FIG. 9, the computing system 1000 may include at least one processor 1100, a memory 1300, a user interface input device 1400, a user interface output device 1500, a storage 1600, or a network interface 1700 connected through a bus 1200.

The processor 1100 may be a semiconductor device executing processing on command languages stored in a central processing unit (CPU) or the memory 1300 and/or storage 1600. The memory 1300 and the storage 1600 may include various types of volatile or nonvolatile storage mediums. For example, the memory 1300 may include a read only memory (ROM) 1310 and a random access memory (RAM) 1320.

Thus, the steps of the method or algorithm described above in relation to one form of the present disclosure may be directly implemented by hardware, a software module, or a combination thereof executed by the processor 1100. The software module may reside in a storage medium (i.e., the memory 1300 and/or the storage 1600) such as a RAM memory, a flash memory, a ROM memory, an EPROM memory, an EEPROM memory, a register, a hard disk, a detachable disk, or a CD-ROM. An exemplary storage medium is coupled to the processor 1100, and the processor 1100 may read information from the storage medium and write information into the storage medium. In another method, the storage medium may be integrated with the processor 1100. The processor 1100 and the storage medium may reside in an application specific integrated circuit (ASIC). The ASIC may reside in a user terminal. In a different method, the processor 1100 and the storage medium may reside as separate components in a user terminal.

As described above, according to the one form of the present disclosure, a lane may be estimated through a nearby obstacle, without relying on a recognition rate of a camera and a high-degree of a detailed map.

The description of the disclosure is merely one in nature and, thus, variations that do not depart from the substance of the disclosure are intended to be within the scope of the disclosure. Such variations are not to be regarded as a departure from the spirit and scope of the disclosure.

What is claimed is:

1. A lane estimating apparatus comprising:
a memory configured to store program instructions; and
a processor configured to execute the stored program instructions and to:
compare a first lane detected by a first sensor with a lane on an actual road or a second lane on a local map having previously stored information regarding reliable lane to determine reliability of the first lane;
detect, when the reliability of the detected first lane is less than a preset reference, a first obstacle detected by a second sensor in the vicinity of a vehicle and a second obstacle on the local map corresponding to the first obstacle;
calculate a difference between slopes and positions of straight lines extracted from the first obstacle and the second obstacle;
correct a heading direction and a position of the vehicle based on the difference between the slopes and positions of the straight lines extracted from the first obstacle and the second obstacle; and
estimate a driving lane based on the corrected heading direction and position of the vehicle on the local map.

2. The lane estimating apparatus according to claim 1, wherein the processor is further configured to:
extract widths of the first obstacle and the second obstacle and to determine whether the first obstacle and the second obstacle are linear obstacles when the extracted widths are equal to or greater than a reference value, or small obstacles when the extracted widths are less than the reference value.

3. The lane estimating apparatus according to claim 2, wherein the processor is further configured to:
when the first obstacle and the second obstacle are small obstacles and two or more first obstacles and second obstacles are detected, extract a first straight line connecting the two second obstacles detected from the local map and a second straight line connecting the two first obstacles detected by the second sensor, and
calculate the difference between the slopes and positions of the first straight line and the second straight line.

4. The lane estimating apparatus according to claim 3, wherein the processor is further configured to:
correct the heading direction and the position of the vehicle based on the difference between the slopes and positions of the first straight line and the second straight line.

5. The lane estimating apparatus according to claim 2, wherein the processor is further configured to:
when the first obstacle and the second obstacle are linear obstacles, extract a third straight line regarding the second obstacle detected from the local map and a fourth straight line regarding the first obstacle detected by the second sensor, and to
calculate the difference between slopes and positions of the third straight line and the fourth straight line.

6. The lane estimating apparatus according to claim 5, wherein the processor is further configured to:
extract linear components from the first obstacle and the second obstacle, to make the extracted linear components straight lines, and
extract the third straight line and the fourth straight line.

7. The lane estimating apparatus according to claim 5, wherein the processor is further configured to:
when it is determined that the linear components extracted from the first obstacle and the second obstacle are curved lines, make tangents that meet one point of each of the extracted curved lines, and
extract the tangents as the third straight line and the fourth straight line.

8. The lane estimating apparatus according to claim 5, wherein the processor is further configured to:
correct the heading direction and the position of the vehicle based on the difference in slopes and positions between the third straight line and the second straight line.

9. The lane estimating apparatus according to claim 1, wherein the processor is further configured to:
update, when the reliability of the first lane is equal to or greater than the preset reference, a current position of the vehicle and information of the first lane on the local map, and to set a target route based on lane information updated on the local map at the current position of the vehicle.

10. The lane estimating apparatus according to claim 9, wherein the processor is further configured to:
set the target route based on a driving lane estimated by the lane estimator.

11. A lane estimating method comprising:
comparing, by a processor, a first lane detected by a first sensor with a lane on an actual road or a second lane on a local map having previously stored information regarding reliable lane to determine reliability of the first lane, wherein the processor is configured to execute program instructions stored in a memory;
detecting, by the processor, when the reliability of the detected first lane is less than a preset reference, a first obstacle detected by a second sensor in the vicinity of a vehicle and a second obstacle on the local map corresponding to the first obstacles;
calculating, by the processor, a difference between slopes and positions of straight lines extracted from the first obstacle and the second obstacle;
correcting, by the processor, a heading direction and a position of the vehicle based on the difference between the slopes and positions of the straight lines extracted from the first obstacle and the second obstacle; and
estimating, by the processor, a driving lane based on the corrected heading direction and position of the vehicle on the local map.

12. The lane estimating method according to claim 11, wherein the calculating of the difference between slopes and positions regarding the obstacles further comprises:
extracting, by the processor, widths of the first obstacle and the second obstacle; and
determining, by the processor, whether the first obstacle and the second obstacle are linear obstacles when the extracted widths are equal to or greater than a reference value, or small obstacles when the extracted widths are less than the reference value.

13. The lane estimating method according to claim 12, wherein the calculating of the difference between the slopes and positions regarding the obstacles comprises:
when the first obstacle and the second obstacle are small obstacles and two or more first obstacles and second obstacles are detected, extracting, by the processor, a first straight line connecting the two second obstacles detected from the local map and a second straight line connecting the two first obstacles detected by the second sensor; and
calculating, by the processor, the difference between the slopes and positions of the first straight line and the second straight line.

14. The lane estimating method according to claim 13, wherein the correcting of the heading direction and position of the vehicle comprises:
correcting, by the processor, the heading direction and the position of the vehicle based on the difference between the slopes and positions of the first straight line and the second straight line.

15. The lane estimating method according to claim 12, wherein the calculating of the difference between the slopes and positions regarding the obstacles comprises:
when the first obstacle and the second obstacle are linear obstacles, extracting, by the processor, a third straight line regarding the second obstacle detected from the local map and a fourth straight line regarding the first obstacle detected by the second sensor; and
calculating, by the processor, the difference between slopes and positions of the third straight line and the fourth straight line.

16. The lane estimating method according to claim 15, wherein the calculating of the difference between the slopes and positions regarding the obstacles comprises:
extracting, by the processor, linear components from the first obstacle and the second obstacle;
making, by the processor, the extracted linear components straight lines; and
extracting the third straight line and the fourth straight line.

17. The lane estimating method according to claim 15, wherein the calculating of the difference between the slopes and positions regarding the obstacles comprises:
   when it is determined that the linear components extracted from the first obstacle and the second obstacle are curved lines, making, by the processor, tangents that meet one point of each of the extracted curved lines; and
   extracting, by the processor, the tangents as the third straight line and the fourth straight line.

18. The lane estimating method according to claim 15, wherein the correcting of the heading direction and position of the vehicle comprises:
   correcting, by the processor, the heading direction and the position of the vehicle based on the difference in slopes and positions between the third straight line and the second straight line.

19. The lane estimating method according to claim 11, further comprising:
   when the reliability of the first lane is equal to or greater than the preset reference, updating, by the processor, a current position of the vehicle and information of the first lane on the local map; and
   setting, by the processor, a target route based on lane information updated on the local map at the current position of the vehicle.

20. The lane estimating method according to claim 19, wherein the setting of the target route further comprises:
   setting, by the processor, the target route based on a driving lane estimated in the course of estimating the lane.

\* \* \* \* \*